(12) United States Patent
Baba et al.

(10) Patent No.: US 6,355,703 B1
(45) Date of Patent: Mar. 12, 2002

(54) LIQUID CURABLE RESIN COMPOSITION, COATING, AND CURED COATING THEREFROM

(75) Inventors: Atsushi Baba, Tsuchiura; Yuichi Eriyama, Umezono; Takashi Ukachi, Kamiya, all of (JP)

(73) Assignees: DSM N. V., Heerlen (NL); JSR Corporation; Japan Fine Coatings Co., Ltd., both of Tokyo (JP)

( * ) Notice: Subject to any disclaimer, the term of this patent is extended or adjusted under 35 U.S.C. 154(b) by 0 days.

(21) Appl. No.: 09/592,615

(22) Filed: Jun. 12, 2000

Related U.S. Application Data

(63) Continuation of application No. PCT/NL98/00706, filed on Dec. 9, 1998.

(30) Foreign Application Priority Data

Dec. 12, 1997 (JP) .............................................. 9/342519

(51) Int. Cl.$^7$ .............................. C08F 2/48; C08K 5/01; C08K 5/05
(52) U.S. Cl. ........................... 522/182; 522/79; 522/80; 522/83; 522/84; 522/91; 522/99; 522/178; 522/120; 522/148; 522/121; 522/122; 522/116; 528/32; 528/26; 526/767; 526/768; 526/765; 526/766
(58) Field of Search .............................. 522/79, 80, 84, 522/99, 83, 91, 148, 178, 182, 113, 119, 120, 121, 116; 528/26, 32; 524/767, 768, 765, 766

(56) References Cited

U.S. PATENT DOCUMENTS

| | | | |
|---|---|---|---|
| 5,260,350 A | 11/1993 | Wright | |
| 5,374,483 A | 12/1994 | Wright | |
| 5,378,735 A | * 1/1995 | Hosokawa et al. | ........... 522/79 |
| 5,712,325 A | 1/1998 | Lewis et al. | |
| 6,160,067 A | 12/2000 | Eriyama et al. | |

FOREIGN PATENT DOCUMENTS

| | | |
|---|---|---|
| DE | 4132230 | 4/1993 |
| EP | 0565093 | 10/1993 |

* cited by examiner

*Primary Examiner*—James J. Seidleck
*Assistant Examiner*—Sanza L. McClendon
(74) *Attorney, Agent, or Firm*—Pillsbury Winthrop LLP

(57) ABSTRACT

The invention relates to a liquid curable resin composition comprising:

(A) a polyfunctional (meth)acrylic compound containing at least three (meth)acryloyl groups in the molecule, (B) a reaction product of an alkoxy silane compound having a polymerizable unsaturated group, an urethane bond group, and an organic group represented by the following formula (1),

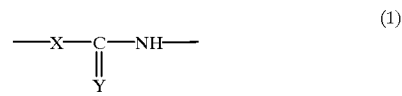

(1)

wherein X is NH—, —O—, or —S— and Y is an oxygen atom or a sulfur atom, and when X is —O—, Y is a sulfur atom, with silica particles, (C) a radiation curable acrylic resin comprising a carboxyl group in its molecule, of which the Tg is 50 or higher, (D) a radiation polymerization initiator, and (E) a non reactive solvent.

The invention further relates to the coating obtained after evaporation of the solvent, and to the cured coating after irradiation.

15 Claims, No Drawings

LIQUID CURABLE RESIN COMPOSITION, COATING, AND CURED COATING THEREFROM

This is a continuation of international appln. no. PCT/NL98/00706, filed Dec. 9, 1998.

DETAILED DESCRIPTION OF THE INVENTION

1. Field of the Invention

The present invention relates to a liquid curable resin composition, and, particularly, to a liquid curable resin composition from which a cured coating exhibits superior scratch resistance, excellent abrasion resistance, superior adhesion to a substrate, and/or fine appearance. Such cured coating can be formed, for example, on the surface of plastic moldings, paintings, and the like. The liquid resin composition can form a coating when dried by volatilization of solvent, which coating can be printed or embossed prior to exposure to activation energy, and can still be molded after a cured coating is formed by the exposure to activation energy. More particularly, the present invention relates to a liquid curable resin composition which can be used as a hard coating for transfer foil films, plastic optical parts, touch panels, film liquid crystal elements, plastic moldings, and the like, and as a stain-proof or scratch-resistant coating for interior flooring materials, wall materials and the like.

2. Prior Art

Conventionally, as a method for protecting the surface of plastic moldings such as transfer foil films, plastic optical parts, touch panels, and film liquid crystal elements, or the surface of paintings for interior flooring materials and wall materials, hard coatings have been applied to the surface of such materials. As these hard coating materials, ultraviolet radiation-curable acrylic hard coating materials such as polyester acrylate, urethane acrylate, and epoxy acrylate were used. However, a scratch resistance, abrasion resistance coating that had adhered to a substrate while having a suitable appearance was unobtainable using only these materials.

As a method for providing scratch resistance, abrasion resistance, and the like for plastic moldings, a method of adding inorganic fillers represented by silica or organic fillers such as polyethylene powder and polycarbonate powder, and a method comprising the addition of additives such as silicone are well known. However, the haze value of the resulting coating is increased or the appearance of the coating is impaired by adding inorganic or organic fillers. Moreover, although the slip characteristics of the surface of the coating are improved by the use of additives such as silicone, the scratch resistance, as demonstrated by Taber's abrasive wheel test, is not exhibited.

A hard coating material using polyfunctional (meth)acrylate having three or more functional groups is disclosed in Japanese Patent Applications Laid-open No. 104683/1978 and No. 97633/1979. In order to improve scratch resistance of the above hard coating material, a method comprising the addition of micro-powdered inorganic fillers or colloidal silica is disclosed in Japanese Patent Applications Laid-open No. 106969/1981 and No. 272041/1990, a method comprising the addition of colloidal silica and silane coupling agents is disclosed in Japanese Patent Applications Laid-open No. 64138/1990 and No. 18423/1992, a method comprising the addition of colloidal silica and an amino-organofunctional silane modified multifunctional acrylate is disclosed in the patents U.S. Pat. Nos. 5,374,483 and 5,260,350, and a method comprising the addition of a reaction product of colloidal silica and alkoxysilylacrylate is disclosed in GB-A-2292946. These hard coating materials are curable by exposure to activation energy and exhibit superior scratch resistance, however, coatings of this type are not printable before curing even after volatilization of the solvent. In addition, moldability of the above coatings after curing by exposure to activation energy is insufficient.

An object of the present invention is to provide a liquid curable resin composition from which a cured coating can be produced having superior scratch resistance, excellent abrasion resistance, superior adhesion to a substrate, and/or fine appearance. The liquid curable resin composition can form a coating when dried by removing solvent which can be printed or embossed prior to irradiation by activation energy, and the composition can be molded after irradiation by activation energy.

Another object of the present invention is to provide a liquid curable resin composition which is particularly useful as a hard coating for transfer foil films, plastic optical parts, touch panels, film liquid crystal elements, plastic moldings, and the like, interior flooring materials, stain-proof and/or scratch-resistant wall materials and the like.

Other objects and advantages of the present invention will be apparent from the following descriptions.

SUMMARY OF THE INVENTION

The above objects and advantages can be achieved in the present invention by a liquid curable resin composition comprising:

(A) a polyfunctional (meth)acrylic compound containing at least three (meth)acryloyl groups in the molecule (herein referred to as "component (A)"), (B) a crosslinkable inorganic particle, specifically a silica particle having a surface with a silane compound comprising a radiation-curable group; (herein referred to as "component (B)"), (C) a radiation-curable acrylic resin having a a Tg of 50° C. or more (herein referred to as "component (C)"), (wherein said radiation-curable acrylic resin preferably comprises a carboxylic acid group; and optionally, (D) a radiation polymerization initiator (hereinafter called "component (D)"), and/or (E) a solvent.

A further embodiment relates to a substrate having a coating which is obtained by applying the radiation curable resin composition, and by evaporation of the solvent (E). Yet a further embodiment relates to the cured coating obtained after irradiation of said resin composition.

DETAILED DESCRIPTION OF THE INVENTION AND PREFERRED EMBODIMENTS

Component A

Component A is a polyfunctional (meth)acrylic compound having at least three (meth)acryloyl groups in a molecule. Component A generally has less than 12 (meth) acryloyl groups, preferably less than 8. The molecular weight of component A is generally less than 1000.

Examples of the polyfunctional (meth)acrylic compound having at least three (meth)acryloyl groups in the moleculeinclude trimethylolpropane tri(meth)acrylate, trimethylolpropanetrioxyethyl (meth)acrylate, tris(2-hydroxyethyl)isocyanurate tri(meth)acrylate, pentaerythritol tri(meth)acrylate, pentaerythritol tetra(meth)acrylate, dipentaerythritol hexa(meth)acrylate, and the like.

Examples of commercially available products of the polyfunctional monomer containing at least three (meth)acryloyl groups in the molecule include Kayarad DPHA, DPCA-20, DPCA-30, DPCA-60, DPCA-120, D-310, D-330, PET-30, GPO-303, TMPTA, THE-330, TPA-330 (manufactured by Nippon Kayaku Co., Ltd.), Aronix M-315, M-325 (manufactured by Toagosei Co., Ltd.), and the like.

The component (A) may be present in an amount preferably from 5 to 30 wt % relative to the total amount of the components (A), (B), and (C), in the composition of the present invention. If this amount is less than 5 wt %, formation of the coating and hardness of the resulting coating tend to be insufficient. On the other hand, if this amount is more than 30 wt %, the dried coating tends to exhibit tackiness.

Component B

Generally, component B of the present invention includes a crosslinkable inorganic particle; this is an inorganic particle, preferably a silica particle, having on its surface a silane compound comprising a radiation curable group.

Preferably, compound B has a silane compound, which is the reaction product of the inorganic particle with alkoxysilane compound having a linking group represented by formula (1)

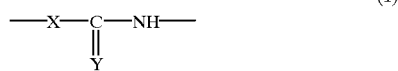
(1)

wherein X represents a divalent group including —NH—, —O—, or —S— and Y represents an oxygen atom or a sulfur atom, provided that when X is —O—, Y is a sulfur atom;

Furthermore, compound B preferably comprises an alkoxysilane compound comprising a linking group represented by formula (1) and a urethane linking group —C(O)NH—;

A preferred alkoxysilane compound can be formed by the addition reaction of alkoxysilane having a mercapto group, specifically, mercaptoalkoxysilane, and a polyisocyanate compound. A more preferred alkoxysilane compound may be formed by further reacting the above alkoxysilane compound, which has at least one free isocyanate group, with a polymerizable unsaturated compound having an active hydrogen which can react with an isocyanate group.

As examples of the method for preparing the alkoxysilane compound, the following methods (A) and (B) can be given.

Method (A): A method for obtaining the alkoxysilane compound by preparing an intermediate containing an alkoxysilyl group, —S(C=O)NH— group, and an isocyanate group in the molecule by reacting the addition product of mercaptoalkoxysilane and the polyisocyanate compound, then reacting the active hydrogen group-containing polymerizable unsaturated compound with the isocyanate residue in the intermediate to bond these compounds via an urethane group.

Method (B): A method for preparing the alkoxysilane compound by preparing an intermediate containing a polymerizable unsaturated group, an urethane bond group, and an isocyanate group in the molecule by reacting the addition product of the polyisocyanate compound and the active hydrogen group-containing polymerizable unsaturated compound, then reacting the mercaptoalkoxysilane with the intermediate to bond these compounds via the —S(C=O)NH— group.

A linear, cyclic, or branched compound having two or more active hydrogens reactive with the isocyanate group in the molecule can be used as a chain elongating agent in the above methods (A) or (B). The chain elongating agent reacts with the polyisocyanate compound to elongate the molecular chain via an urethane bond.

As examples of the alkoxysilane which can form a —S(C=O)NH— bond by the reaction with the polyisocyanate compound a compound having one or more alkoxysilyl groups and one or more mercapto groups in the molecule can be given.

As examples of such a compound, mercaptoalkoxysilanes such as mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriethoxysilane, mercaptopropyltriphenoxysilane, and mercaptopropyltributoxysilane can be given. Of these, mercaptopropyltrimethoxysilane and mercaptopropyltriethoxysilane are preferable. Examples of commercially available products of the mercaptoalkoxysilane include SH6062 (manufactured by Toray-Dow Corning silicone Co., Ltd.) and the like. These mercaptoalkoxysilanes may be used either individuality or in combinations of two or more. Moreover, as examples of the mercaptoalkoxysilane, an addition product of amino group-substituted alkoxysilane with epoxy group-substituted mercaptan and an addition product of epoxysilane with α,ω-dimercapto compound can be used. The polyisocyanate compound used in the preparation of the alkoxysilane compound can be selected from the group consisting of linear saturated hydrocarbon-type polyisocyanate compounds, cyclic saturated hydrocarbon-type polyisocyanate compounds, aromatic hydrocarbon-type polyisocyanate compounds. These compounds can be used either individuality or in combinations of two or more. The number of isocyanate groups in one molecule is usually from 2 to 29, and preferably from 2 to 9. If the number is 30 or more, the viscosity of the reaction product increases, whereby workability is occasionally impaired.

Examples of the polyisocyanate compound include: linear hydrocarbon polyisocyanate compounds such as tetramethylene diisocyanate, hexamethylene diisocyanate, and 2,2,4-trimethylhexamethylene diisocyanate; cyclic saturated hydrocarbon polyisocyanate compounds such as isophorone diisocyanate, dicyclohexylmethane diisocyanate, methylenebis(4-cyclohexyl isocyanate), hydrogenated diphenylmethane diisocyanate, hydrogenated xylene diisocyanate, hydrogenated toluene diisocyanate, and 1,3-bis(isocyanatemethyl)cyclohexane; aromatic hydrocarbon polyisocyanate compounds such as 2,4-tolylene diisocyanate, 2,6-tolylene diisocyanate, 1,3-xylylene diisocyanate, 1,4-xylylene diisocyanate, p-phenylene diisocyanate, 3,3'-dimethyl-4,4'-diphenylmethane diisocyanate, diphenylmethane-4,4'-diisocyanate, 4,4'-biphenylene diisocyanate, 6-isopropyl-1,3-phenyl diisocyanate, 4-diphenylpropane diisocyanate, lysine diisocyanate, 1,5-naphthalene diisocyanate, polyisocyanate of polydiphenylmethane.

Of these, cyclic saturated hydrocarbon polyisocyanate compounds and aromatic hydrocarbon polyisocyanate compounds are preferable, and cyclic saturated hydrocarbon polyisocyanate compounds are particularly preferable. Isophorone diisocyanate, hydrogenated xylene diisocyanate, and hydrogenated toluene diisocyanate can be given as specific examples of the cyclic saturated hydrocarbon polyisocyanate compound. Examples of commercially available products of the polyisocyanate compound include TDI-80/

20, TDI-100, MDI-CR100, MDI-CR300, MDI-PH, NDI (manufactured by is Mitsui Nisso Urethane Co., Ltd.), Coronate T, Millionate MT, Millionate MR, HDI (manufactured by Japan Polyurethane industries Co., Ltd.), and Takenate 600 (manufactured by TAKEDA CHEMICAL INDUSTRIES). In the above method (A), the polyisocyanate compound is used in an amount so that the equivalent of the isocyanate group contained in the polyisocyanate compound is usually in a range from 0.1 to 100, preferably 0.5 to 10, and particularly preferably 0.9 to 1.2, for one equivalent of the mercapto group of the mercaptoalkoxysilane. If the equivalent of the isocyanate group is less than 0.1, 0.9 equivalent of the mercaptosilane remain unreacted, whereby the formed coating occasionally exhibits insufficient abrasion resistance. On the other hand, if the equivalent of the isocyanate group is more than 100, an excess amount of the isocyanate group remains unreacted, whereby the formed coating sometimes exhibits inferior weatherability.

In the above method (B), the polyisocyanate compound is used in an amount so that the equivalent of the isocyanate group contained in the polyisocyanate compound is usually in the range from 0.1 to 100, preferably from 0.5 to 10, and particularly preferably from 0.9 to 1.2, for one equivalent of the active hydrogen group in the active hydrogen group-containing polymerizable unsaturated compound.

Catalysts may be added to reduce the reaction time in the methods (A) and (B). Basic catalysts or acidic catalysts can be used as these catalysts. As examples of the basic catalysts, amines such as pyridine, pyrrole, triethylamine, diethylamine, dibutylamine, and ammonia, and phosphines such as tributylphosphine and triphenylphosphine can be given. Of these, tertiary amines such as pyridine and triethylamine are preferable. Examples of the acidic catalysts include metal alkoxides such as copper naphthenate, cobalt naphthenate, zinc naphthenate, 1,4-diazabicyclo[2.2.2] octane (DABCO), methyl DABCO, aluminum tributoxide, trititanium tetrabutoxide, and zirconium tetrabutoxide; Lewis acids such as trifluoroborondiethyl etherate and aluminium chloride; and tin compounds such as tin 2-ethylhexanoate, octyltin trilaurate, dibutyl tin dilaurate, and octyl tin diacetate. Of these catalysts, the acidic catalysts are preferable. Among the acidic catalysts, tin compounds are preferable, and octyl tin trilaurate, dibutyl tin dilaurate, octyl tin diacetate, and the like are particularly preferable. The amount of these catalysts to be added is 0.01 to 5 parts by weight, and preferably 0.1 to 1 part by weight, for 100 parts by weight of the polyisocyanate compound. If the amount is less than 0.01 part by weight, the reaction time is only slightly reduced by the addition of the catalyst. On the other hand, if the amount is more than 5 parts by weight, storage stability of the reaction product may deteriorate.

In the preparation of the alkoxysilyl compound, as examples of the polymerizable unsaturated compound which can bond with the polyisocyanate compound via an urethane bond by the addition reaction, a compound having one or more active hydrogen atoms which can form an urethane bond by the addition reaction with the isocyanate group and one or more polymerizable unsaturated groups in the molecule can be given. These compounds can be used either individualy or in combinations of two or more.

As examples of the above compounds, carboxylic acid-containing polymerizable unsaturated compounds and hydroxyl group-containing polymerizable unsaturated compounds can be given. As the carboxylic acid-containing a polymerizable unsaturated compound, unsaturated aliphatic carboxylic acids such as (meth)acrylic acid, itaconic acid, cinnamic acid, maleic acid, fumaric acid, 2-(meth) acryloxypropyl-hexahydrogen phthalate, 2-(meth) acryloxyethyl-hexahydrogen phthalate; unsaturated aromatic carboxylic acids such as 2-(meth)acryloxypropyl phthalate and 2-(meth)acryloxypropylethyl phthalate; and the like can be given. As examples of the hydroxyl group-containing polymerizable unsaturated compound, hydroxyl group containing acrylates, hydroxyl group-containing methacrylates, and hydroxyl group-containing styrenes such as 2-hydroxyethyl (meth)acrylate, 2-hydroxypropyl (meth) acrylate, 2-hydroxybutyl (meth)acrylate, 2-hydroxy-3-phenyloxypropyl (meth)acrylate, 1,4-butanediol mono (meth)acrylate, 2-hydroxyalkyl (meth)acryloyl phosphate, 4-hydroxycyclohexyl (meth)acrylate, neopentyl glycol mono (meth)acrylate, poly(pentamethyleneoxycarboxylate) ethoxy (meth)acrylate, hydroxystyrene, hydroxy-$\alpha$-methylstyrene, hydroxyethylstyrene, polyethylene glycol styryl ether with a terminal hydroxyl group, polypropylene glycol styryl ether with a terminal hydroxyl group, polytetramethylene glycol styryl ether with a terminal hydroxyl group, polyethylene glycol (meth)acrylate with a terminal hydroxyl group, polypropylene glycol (meth)acrylate with a terminal hydroxyl group, polytetraethylene glycol (meth) acrylate with a terminal hydroxyl group, trimethylolpropane di(meth)acrylate, trimethylolpropane mono(meth)acrylate, EO-modified trimethylolpropane tri(meth)acrylate, PO-modified trimethylolpropane tri(meth)acrylate, pentaerythritol tri(meth)acrylate, pentaerythritol di(meth) acrylate, pentaerythritol mono(meth)acrylate, dipentaerythritol penta(meth)acrylate, dipentaerythritol tetra(meth) acrylate, dipentaerythritol tri(meth)acrylate, dipentaerythritol di(meth)acrylate, and dipentaerythritol mono(meth)acrylate can be given.

Of these, unsaturated aliphatic carboxylic acid and hydroxyl group-containing acrylate compounds are preferable, and hydroxyl group-containing acrylate compounds are particularly preferable. 2-Hydroxyethyl acrylate, 2-hydroxypropyl acrylate, pentaerythritol triacylate, dipentaerythritol pentacrylate, and the like can be given as specific examples of such compounds.

The polymerizable unsaturated compounds are usually used in an amount so that the equivalent of the active hydrogen group is one or more for one equivalent of the residual isocyanate group in the intermediate obtained by the addition reaction of the mercaptoalkoxysilane with the polyisocyanate compound. If the equivalent is less than one, since the reactive isocyanate group remains in the alkoxysilyl compound, undesirable phenomena such as foaming, increase in viscosity, and coloring caused by the reaction with water may occur.

In the preparation of the alkoxysilyl compound, for improving flexibility and adhesion to a substrate of the coating, a divalent organic group may be introduced between the alkoxysilyl group and the polymerizable unsaturated group by the addition reaction with the polyisocyanate compound. As examples of the divalent organic compound unit precursors, a linear, cyclic, or branched organic compound having two or more active hydrogens reactive with the isocyanate group by an addition reaction in the molecule can be used. As examples of the group having the active hydrogens, a hydroxyl group, carboxyl group, mercapto group, amino group, sulfonic group, phosphoric acid group, silanol group, and the like can be given. These organic compounds contain two or more, preferably from two to nine, and particularly preferably two active hydrogens. The molecular weight of the compound having the active hydrogens is usually from 50 to 100,000, preferably from 100 to 50,000, and more preferably from 500 to 10,000. As examples of such a divalent organic compound, polyalkylene glycols, polyalkylene thioglycols, polyester diols, polyamides, polycarbonate diols, polyalkylene diamines, polyalkylene dicarboxylic acids, polyalkylene diols, polyalkylene dimercaptans, and the like can be given. Of these, polyalkylene glycols are preferable. As examples of the polyalkylene glycols, polyethylene glycol, polypropylene glycol, polytetraethylene glycol, polyhexamethylene glycol, copolymers of these compounds with two or more polyalkylene glycols, and the like can be given. These compounds can be used either individually or in combinations of two or more. Examples of commercially available products of the compound include UNISAFE DC1100, UNISAFE DC 1800, UNISAFE DCB 1100, UNISAFE DCB1800 (manufactured by Nippon Oil and Fats Co., Ltd.), PPTG4000, PPTG2000, PPTG1000, PTG2000, PTG3000, PTG650, PTGL2000, PTGL1000 (manufactured by Hodogaya Chemical Co., Ltd.), EXENOL1020 (manufactured by Asahi Glass Co., Ltd.), PBG3000, PBG2000, PBG1000, Z3001 (manufactured by Daiichi Kogyo Seiyaku Co., Ltd), and the like.

The preparation of the polymerizable unsaturated group-containing alkoxysilane having a polyalkylene glycol as the divalent organic group is described in the following methods (C) and (D).

Method (C): Polyalkylene glycol is added to an addition product of the mercaptoalkoxysilane and a polyisocyanate compound having a terminal reactive isocyanate group to prepare an alkoxysilane with a hydroxyl group at one terminal, which is then reacted with a separately prepared addition product of the polymerizable unsaturated compound with a terminal hydroxyl group and the polyisocyanate compound, to bond both of the groups via an urethane bond.

Method (D): An addition product of the mercaptoalkoxysilane with a terminal reactive isocyanate group and the polyisocyanate compound is reacted with a separately prepared addition product of the polyalkylene glycol polyisocyanate compound with a terminal reactive hydroxyl group and the hydroxyl group-containing polymerizable unsaturated compound, to bond both of the groups via a urethane bond.

In the above methods (C) and (D), the reaction conditions to form the urethane bond are the same as in the methods (A) and (B), and the equivalent of the compound with a terminal hydroxyl group is in the range from 1.0 to 1.2 for one equivalent of the compound with a terminal reactive isocyanate group, which take part in the bond formation. If the equivalent is less than 1.0, coloring and an increase in viscosity due to the unreacted isocyanate group may occur.

In the preparation of the alkoxysilane compound, a hydrolyzate with the other organic alkoxysilanes can be used as the hydrolyzate of the polymerizable unsaturated group-containing alkoxysilane. For example, condensation products with alkylalkoxysilanes such as tetramethoxysilane, tetraethoxysilane, tetrabutoxysilane, methyltrimethoxysilane, methyltriethoxysilane, dimethyldimethoxysilane, and phenyltrimethoxysilane may be used. The amount of water used in the hydrolysis reaction is usually 0.5 to 1.5 equivalents for the total amount of the alkoxy groups, and the condensation polymer is prepared by hydrolysis by stirring the mixture in the presence or absence of a solvent for 24 hours at a temperature in a range from 0 to the boiling point of the components. In the above process, acidic catalysts or basic catalysts can be used for reducing the reaction time.

Preferably, the alkoxysilane compound of the present invention comprises at least one polymerizable unsaturated group, one urethane bond group, one organic group represented by the above formula (1), and one alkoxysilyl group in the molecule. The alkoxysilyl group bonds to a silanol group on the surface of an inorganic particle preferably a silica particle by a hydrolysis and condensation reaction. The polymerizable unsaturated group is the component which chemically cross-links the molecules through addition polymerization in the presence of activated radicals. The divalent organic group —X(C=Y)NH— (formula (1)) and the urethane bond group are the groups which combine a molecule piece having the alkoxysilyl group to a molecule piece having the polymerizable unsaturated group directly or via other molecule pieces. At the same time, these groups generate appropriate intermolecular cohesion by a hydrogen bond, whereby the cured product of the composition of the present invention exhibits high mechanical strength, superior adhesion to a substrate, excellent heat resistance, and the like.

As the —X(C=Y)NH— group, an —S(C=O)NH— group is preferable.

A preferred alkoxysilane compound may be represented by the following general formula (2):

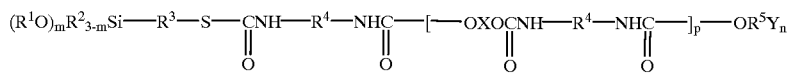

(2)

In the above formula (3), $R^1$ represents a hydrogen atom or a monovalent organic group having 1 to 8 carbon atoms, preferably a methyl group, ethyl group, propyl group, butyl group, phenyl group, or an octyl group. $R^2$ represents a hydrogen atom or a monovalent alkyl group having 1 to 3 carbon atoms. m represents an integer from 1–3. Examples of the alkoxysilyl group represented by $(R^1O)_m R^2_{3-m}Si$— in the above formula (2) include trimethoxysilyl group, triethoxysilyl group, triphenoxysilyl group, methyldimethoxysilyl group, dimethylmethoxysilyl group, and the like. Of these, a trimethoxysilyl group and triethoxysilyl group are preferable. $R^3$ is a divalent organic group having 1 to 3 carbon atoms.

The structural unit represented by —[OXO(C=O)NH—$R^4$—NH(C=O)]$_p$— is introduced to provide an extended molecular chain in the structure of the above formula (2). $R^4$ is a divalent organic group, which may be either the same or different from $R^3$. $R^4$ is selected from divalent organic groups having a molecular weight of usually from 14 to 10,000, and preferably from 78 to 1,000. Examples of the organic group include: linear polyalkylene groups such as methylene, ethylene, propylene, hexamethylene, octamethylene, and dodecamethylene; alicyclic or polycyclic divalent organic groups such as cyclohexylene and norbornylene; divalent aromatic groups such as vinylene, phenylene, naphthylene, biphenylene, and polyphenylene; and alkyl group or aryl group substitution products of the above groups. These divalent organic groups may contain an atomic group consisting of elements other than carbon atoms and hydrogen atoms. In the above formula (2), p is 0 or 1, X is a divalent organic group, and more particularly, X is a divalent organic group derived from a compound having two or more active hydrogen atoms in the molecule which can react with an isocyanate group by the addition reaction. As examples of the divalent organic groups, a divalent organic group derived from polyalkylene glycol, polyalkylene thioglycol, polyester, polyamide, polycarbonate, polyalkylenediamine, polyalkylene dicarboxylic acid, polyalkylene diol, and polyalkylenedimercaptan by removing two active hydrogen atoms from these compounds can be given. $R^5$ is a (n+1) valence organic group. The organic group represented by $R^5$ is preferably selected from the group consisting of linear, branched, or cyclic saturated hydrocarbon groups, unsaturated hydrocarbon groups, and alicyclic groups. n is an integer from preferably 1 to 20, more preferably 1 to 10, and particularly preferably 3 to 5. In the above formula, Y is a monovalent organic group having a polymerizable unsaturated group which cross-links the molecules in the presence of activated radicals in the molecule. As examples of the organic groups represented by Y, an acryloxy group, methacryloxy group, vinyl group, propenyl group, butadienyl group, styryl group, ethynyl group, cinnamoyl group, maleate group, acrylamide group, and the like can be given. Of these, an acryloxy group is preferable.

Preferably, the reaction product used as the component (B) in the present invention is prepared by a process including the mixing of the alkoxysilane compound with inorganic particles. The content of the alkoxysilane compound residue attached to the inorganic particles is preferably 0.01 wt % or more, more preferably 0.1 wt % or more, and particularly preferably 1 wt % or more. This wt. % is given relative to the weight of the surface treated particles, after being dried (i.e., excess alkoxysilane removed).

If the content of the alkoxysilane compound residue attached to the inorganic particles is less than 0.01 wt %, dispersibility, transparency, and abrasion resistance of the inorganic particles in the composition may be insufficient.

The solvent based raw material composition in the preparation of component (B) comprises, relative to the total raw material composition including solvent, the alkoxysilane compound in amount of 5 wt % or more, and preferably 20 wt % or more. If the proportion of the alkoxysilane compound is less than 5 wt %, the composition of the present invention may exhibit poor formation of the coatings. The proportion of the inorganic particles in the component (B) [this is the raw material without the solvent] in the raw material composition is preferably 95 wt % or less, and particularly preferably 80 wt % or less. If the proportion is more than 95 wt %, dispersibility, transparency, and abrasion resistance of the composition of the present invention may be insufficient.

Inorganic particles used for preparing the component (B), preferably include a powdery or colloidal silica having an average particle diameter preferably from 0.001 to 20 μm. In forming a transparent film using the composition of the present invention, the particle diameter of the silica particles is preferably from 0.01 to 2 μm, and more preferably from 0.01 to 0.05 μm. The form of the silica particles may be spherical, hollow, porous, rod-like, plate-like, fibrous, or amorphous. Of these, spherical silica particles are preferable. The specific surface area of the silica particles is preferably from 0.1 to 3000 m$^2$/g, and more preferably from 10 to 1500 m$^2$/g. These silica particles can be used in the state of a dry powder or can be dispersed in water or an organic solvent. A dispersion liquid of fine silica particles which is known as colloidal silica in the art can also be used. If transparency is especially required, colloidal silica can be preferably used. When the dispersion medium for the colloidal silica is water, acid colloidal silica with a pH preferably from 2 to 10, and more preferably 3 to 7, is used. When the dispersion medium for the colloidal silica is an organic solvent, solvents such as methanol, isopropyl alcohol, ethylene glycol, butanol, ethylene glycol monopropyl ether, methyl ethyl ketone, methyl isobutyl ketone, toluene, xylene, and dimethyl formamide and organic solvents mutually soluble with these solvents can be given as examples of the organic solvents. These solvents can be used as a mixture with water. The preferable dispersion medium is methanol, isopropyl alcohol, methyl ethyl ketone, or xylene. Examples of commercially available products of silica particles include colloidal silica such as Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, and ST-OL (manufactured by Nissan Chemical Industries Co., Ltd.) and silica powders such as AEROSIL 130, 300, 380, TT600, and OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), Silicia 470 (manufactured by Fuji Silycia Chemical Co.), and SG Flake (manufactured by Nippon Sheet Glass Co., Ltd.).

The amount of the alkoxysilane compound attached to the silica particles can usually be determined by, for example, by thermogravimetric analysis from room temperature to 800° C. in air from a weight loss in percent when the dry particles are completely combusted in air.

Water consumed by hydrolysis of the alkoxysilane compound in the preparation of the component (B) may be in an amount so that at least one alkoxy group on silicon in one molecule can be hydrolyzed. The amount of water added or present in hydrolysis is preferably ⅓ or more, and more preferably ½ or more, but less than three times the total mols of the alkoxy group on the silicon. Mixing the alkoxysilane compound of the above formula (2) with silica particles in the absence of water produces silica particles with the alkoxysilane compound merely physically adhering to the surface thereof. Such a component cannot produce a composition exhibiting low abrasion resistance, which is one of the objects in the composition of the present invention.

In the preparation of the component (B) of the present invention, the following methods can be employed: stirring the mixture of the separately hydrolyzed alkoxysilane compound represented by the formula (2) with powdered silica particles or colloidal silica while heating; hydrolysis of the alkoxysilane compound represented by the formula (2) in the presence of silica particles; surface treatment of silica particles in the presence of other components such as polyfunctional unsaturated organic compound, monovalent unsaturated organic compound, and a photo-initiator; and the like. Of these, hydrolysis of the alkoxysilane compound represented by the formula (2) in the presence of silica particles is preferable. The component (B) can be prepared usually at a temperature of 20° C. to 150° C. for 5 minutes to 24 hours.

Silica particles are known to contain water adsorbed on the surface of the particles during usual storage. For example, a commercially available colloidal silica dispersed in an organic solvent, contains water usually in an amount of about 0.5%. Therefore, the component (B) can be prepared by stirring the mixture of the alkoxysilane compound with powder silica particles while heating, utilizing the water contained in the raw material.

In the preparation of the component (B) of the present invention, organic solvents which are mutually soluble with water may be added for ensuring a smooth and uniform reaction of silica powder with the alkoxysilane compound. As examples of such organic solvents, alcohols, ketones, ethers, and amides are preferable. Specific examples include: alcohols such as methanol, ethanol, isopropyl alcohol, and butanol; ketones such as acetone, methyl ethyl ketone, and methyl isobutyl ketone; ethers such as ethylene glycol monomethyl ether and ethylene glycol monobutyl ether; amides such as dimethyl formamide, dimethyl acetamide, N-methyl pyrrolidone, and y-butyrolactone. There are no limitations to the amount of these solvents as far as a smooth and uniform reaction can be ensured.

In order to promote the reaction in the preparation of the component (B), acids or bases may be added as a catalyst. As examples of the acids, inorganic acids such as hydrochloric acid, nitric acid, sulfuric acid, phosphoric acid, organic acids such as methanesulfonic acid, toluenesulfonic acid, phthalic acid, malonic acid, formic acid, acetic acid, and oxalic acid, unsaturated organic acids such as methacrylic acid, acrylic acid, and itaconic acid, and ammonium salts such as tetramethylammonium hydrochloride and tetrabutylammonium hydrochloride, and the like can be given. As examples of the bases, primary, secondary, or tertiary aliphatic amines such as aqueous ammonia, diethylamine, triethylamine, dibutylamine, cyclohexylamine, aromatic amines such as pyridine, and quarternary ammonium hydroxides such as sodium hydroxide, potassium hydroxide, tetramethylammonium hydroxide, tetrabutylammonium hydroxide, and the like can be given. Among these, organic acids and unsaturated organic acids, tertiary amines or quarternary ammonium hydroxides are given as preferable acids and bases, respectively. These acids and bases are added in the amount of 0.01 to 1.0 part by weight, and preferably 0.01 to 0.1 part by weight, for 100 parts by weight of the alkoxysilane compound.

The component (B) is used in an amount of preferably 20 to 85 wt % relative to the total amount of the components (A), (B), (C), and (D) of the composition of the present invention. If this amount is less than 20 wt %, the resulting coating exhibits insufficient hardness and inferior abrasion resistance. On the other hand, if this amount is more than 85 wt %, formation of the coatings tends to be insufficient.

Component (C)

The radiation curable acrylic resin used as the component (C) in the present invention has a Tg of 50° C. or higher and preferably comprises at least one carboxyl group.

The component (C) is used in the amount of preferably 10 to 50 wt % for the total weight of the components (A), (B), (C), and (D) of the composition of the present invention. If the amount is less than 10 wt %, the dried coating exhibits tackiness. On the other hand, if the amount is more than 50 wt %, hardness of the resulting coating may be insufficient.

The component (C) will be described below.

The radiation curable acrylic resin used as the component (C) is prepared, for example, by reacting (a) an acrylic polymer having carboxylic acid groups with (b) a compound having an epoxy group and an unsaturated bond in the molecule.

Examples of the carboxylic acid group-containing acrylic polymer (a) (herein referred to as "acrylic polymer (a)") include: polymers having an unsaturated group and a carboxylic acid group, for example, polymers of acrylic acid and methacrylic acid; polymers of acrylic acid-modified unsaturated carboxylic acids, in which the molecular chain is elongated between an unsaturated group and a carboxyl group, such as β-carboxyethyl (meth)acrylate; polymers of unsaturated carboxylic acids having an ester bond by, for example, lactone-modification of β-carboxyethyl (meth)acrylate; polymers of modified unsaturated carboxylic acids having an ether bond by EO- or PO-modification of β-carboxyethyl (meth)acrylate; and vinyl copolymers obtained by the copolymerization of these unsaturated carboxylic acids with other ethylenic unsaturated monomers, as required. Examples of the above modified unsaturated carboxylic acids may be represented by the following formula (3) and (3'):

wherein $R_1$ represents a hydrogen atom or methyl group, $R_2$ represents an alkylene group having 2 to 6 carbon atoms, each $R_3$ independently represents an alkylene group having 3 to 10 carbon atoms, $R_4$ may represent either a direct bond or a linear or branched hydrocarbon group having 1 to 50 carbon atoms with a valence of (m+1), n is an integer from 1 to 10, and m is an integer from 1 to 5.

Examples of compounds represented by the general formula (3) includes compounds obtained by modifying (meth)acrylic acids with lactones such as δ-valerolactone, β-methyl-δ-valerolactone, ε-caprolactone, 3,3,5-trimethylcaprolactone, and 3,5,5-trimethyl-caprolactone can be given. Examples compounds represented by general formula (3') include compounds obtained by modifying (meth)acrylic acid hydroxyalkyls such as (meth)acrylic acid 2-hydroxyethyl, (meth)acrylic acid 2-hydroxypropyl, (meth)acrylic acid 2-hydroxybutyl, and (meth)acrylic acid 2-hydroxypentyl with lactones such as δ-valerolactone, β-methyl-δ-valerolactone, ε-caprolactone, 3,3,5-trimethylcaprolactone, and 3,5,5-trimethyl-caprolactone with an acid-modified terminal hydroxyl group using a polybasic acid or a polybasic acid anhydride, and the like can be given. There are no specific limitations to the polybasic acids or polybasic acid anhydrides which can be used, provided these are divalent or more. As examples of the polybasic acids or polybasic acid anhydrides, maleic acid, phthalic acid, trimellitic acid, pyromellitic acid, itaconic acid, tetrahydrophthalic acid, oxalic acid, adipic acid, fumaric acid, malonic acid, glutaric acid, pimelic acid, acid anhydrides corresponding to these acids, and the like can be given. These polybasic acids or polybasic acid anhydrides may be used either individually or in combinations of two or more.

As examples of the foregoing other ethylenically unsaturated monomers, alkyl (meth)acrylates such as methyl (meth)acrylate, ethyl (meth)acrylate, isopropyl (meth)acrylate, n-butyl (meth)acrylate, and 2-ethylhexyl (meth)acrylate; glycidyl (meth)acrylate; (meth)acrylamide; amino alkyl methacrylates such as aminomethyl (meth)acrylate, N-methylaminomethyl (meth)acrylate, and N,N-dimethylamino methyl (meth)acrylate; styrene monomers such as styrene, vinyl toluene, and α-methylstyrene; vinyl acetate; and the like is given. In addition, monoethylenically unsaturated monomers having a hydroxyl group can be used, as required. As examples of these monomers, hydroxy alkyl (meth)acrylates such as 2-hydroxyethyl (meth)acrylate, 2-hydroxypropyl (meth)acrylate, and 2-hydroxypentyl (meth)acrylate and lactone-modified monomers of these monomers, and the like can be given.

Although the ratio of the polymerization of (meth)acrylic acids and the other ethylenically unsaturated monomers in the preparation of the acrylic polymer (a) can be determined according to the number of double bonds introduced into the radiation curable acrylic resin, which is the component (C), or the desired acid value, the ratio is preferably determined so that the acid value of the acrylic polymer (a) is 50 to 650 KOH mg/g. If the acid value of the acrylic polymer (a) is less than 50 KOH mg/g, because the amount of the compound (b) having an epoxy group and an unsaturated bond in the molecule which can be added to the acrylic resin (a) (hereinafter called "compound (b)") decreases, sufficient properties of a radiation curable resin can not be obtained. If the acid value is more than 650 KOH mg/g, solvents which can be used are limited. Acid values are measured using KOH according to JIS K1557.

There is no specific limitation to the method of synthesizing the acrylic polymer (a), provided the above-mentioned resin can be obtained. However, polymerization in appropriate reaction solvent (solution polymerization) is preferable in view of the ease of reaction and the like. Examples of the reaction solvent include: alcohols such as methanol and ethanol; cyclic ethers such as tetrahydrofuran and dioxane; cellosolve esters such as methylcellosolve acetate; alkyl ethers of polyhydric alcohols such as ethylene glycol, ethylene glycol monomethyl ether, ethylene glycol monoethyl ether, ethylene glycol dimethyl ether, propylene glycol monomethyl ether, propylene glycol propyl ether, diethylene glycol monomethyl ether, diethylene glycol dimethyl ether, diethylene glycol diethyl ether, and dipropylene glycol monomethyl ether; aromatic hydrocarbons such as toluene and xylene; ketones such as acetone, methyl ethyl ketone, and methyl isobutyl ketone; esters such as ethyl acetate, butyl acetate, propylene glycol methyl ether acetate, and ethyl lactate; and the like. Of these, cyclic ethers, alkyl esters of polyhydric alcohols, and esters are preferable. These solvents can be used either individually or in combinations of two or more.

As polymerization catalysts for radical polymerization, commonly used radical polymerization initiators can be used. As examples of radical polymerization initiators, azo compounds such as 2,2'-azobisisobutyronitrile, 2,2'-azobis-(2,4-dimethylvaleronitrile), and 2,2'-azobis(4-methoxy-2,4-dimethylvaleronitrile), organic peroxides and hydrogen peroxides, benzoyl peroxide, lauroyl peroxide, t-butylperoxy pivalate, and 1,1'-bis-(t-butylperoxy)-cyclohexane, and the like can be given. In addition, peroxides may be used as redox radical polymerization initiators by combination with reducing agents.

Radiation curable acrylic resin, which is the component (C) in the present invention, is obtained by reacting the radical polymerization compound (b) having an epoxy group with a carboxylic acid group of the acrylic polymer (a) preferably using an ammonium catalysts such as bromide tetrabutyl ammonium. As examples of the radical polymerization compound (b) having an epoxy group, glycidyl (meth)acrylate, α-ethylglycidyl acrylate, α-n-propylglycidyl acrylate, αn-butylglycidyl acrylate, 3,4-epoxybutyl (meth)acrylate, 6,7-epoxyheptyl (meth)acrylate, 6,7-epoxyheptyl-α-ethyl acrylate, and cycloalkene oxide (meth)acrylate, and the like can be given. Of these, a compound having an alicyclic epoxy group and an unsaturated compound in the molecule such as cyclohexene oxide (meth)acrylate and the like is particularly preferable.

Preferably, the Tg, as measured as a homopolymer of the radiation curable acrylic resin, of the component (C) of the present invention must be 50° C. or higher, and preferably 100° C. or higher. The upper limit of the Tg is generally less than about 400° C.

If the Tg of the radiation curable acrylic resin, the component (C), is lower than 50° C., printing, embossing, and the like can not be provided before exposure to active energy radiation, because the coating prepared by applying the liquid resin on a substrate and drying the solvent remains to be tack.

The acid value of the component (C) is preferably 20 to 650 KOH mg/g, and particularly preferably 50 to 300 KOH mg/g. If the acid value of the component (C) is less than 20 KOH mg/g, since the component (C) can not be dissolved in polar solvents such as methanol, storage stability of the liquid resin in the solvent deteriorates. If the acid value of the component (C) is more than 650 KOH mg/g, the component (C) can not be dissolved in non-polar solvents but only in high polar solvents such as methanol. Moreover, the increase in water absorption of the cured coating causes undesirable effects such as inferior surface hardness. Acid values are measured using KOH according to JIS K1557.

As commercially available products of the above radiation curable resin having an unsaturated group, Cyclomer ACA-200, ACA-200M, ACA-250, ACA-210P (manufactured by Daicel Chemical Industries, Ltd.), and the like can be given.

Component (D)

As radiation polymerization initiators which are used as the component (D) in the present invention, radiation polymerization initiators which initiate polymerization by decomposing itself and generating radicals by irradiation may be used. Moreover, photosensitizers can be used in combination, as required. In the present invention, "radiation" involves infrared rays, visible rays, ultraviolet rays, deep ultraviolet rays, X-rays, electron beams, α-rays, β-rays, γ-rays, and the like. UV and visible light is preferred.

Specific examples of the above radiation polymerization initiators include: acetophenone, acetophenone benzyl ketal, anthraquinone, 1-hydroxycyclohexylphenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, carbazole, xanthone, 1,1-dimethoxydeoxybenzoin, 3,3'-dimethyl-4-methoxybenzophenone, thioxanethone compounds, diethylthioxanthone, 2-isopropylthioxanthone, 2-chlorothioxanthone, 1-(4-dodecylphenyl)-2- hydroxy-2-methylpropan-1-one, 2-methyl-1-4-(methylthio)phenyl-2-morpholino-propan-1-one, triphenylamine, 2,4,6-trimethylbenzoyl-diphenylphosphine oxide, bis-(2,6-dimethoxybenzoyl)-2,4,4-trimethylpentylphosphine oxide, bisacylphosphine oxide, benzyl methyl ketal, 1-hydroxycyclohexylphenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 2-benzyl-2-dimethylamino-1-(4-morpholinophnyl)-butane-1-one, 3-methylacetophenone, 3,3',4,4'-tetra (t-butylperoxycarbonyl) benzophenone (BTTB), combinations of BTTB with dye sensitizers such as xanthene, thioxanthene, cumarin, and ketocumarin, and the like.

Of these, benzyl methyl ketal, 1-hydroxycyclohexylphenyl ketone, 2,4,6-trimethylbenzoyl-diphenylphosphine oxide, Bis-(2,6-dimethoxybenzoyl)-2,4,4-trimethylpentylphosphine oxide, 2-benzyl-2-dimethylamino-1-(4-morpholinophenyl)-butane-1-one, and the like are preferable.

As examples of commercially available products used as the radiation polymerization initiators, Irgacure 184, 651, 500, 907, 369, 784, 2959 (manufactured by Ciba Specialty Chemicals Co., Ltd.), Lucirine TPO (manufactured by BASF), Darocur 1116, 1173 (manufactured by Ciba Specialty Chemicals Co., Ltd.), Ubecryl P36 (manufactured by UCB Co.), Escacure KIP 150, KIP 100F (manufactured by Lamberti), and the like can be given.

As examples of photosensitizers, triethylamine, diethylamine, N-methyldiethanoleamine, ethanolamine, 4-dimethylaminobenzoic acid, 4-methyl dimethylaminobenzoate, 4-ethyl dimethylaminobenzoate, 4-isoamyl dimethylaminobenzoate, and the like, and commercially available products such as Ubecryl P102, 103, 104, 105 (manufactured by UCB Co.) can be given.

The proportion of the radiation polymerization initiator, which is component (D) of the present invention, in the composition of the present invention is usually 0.01 to 10 wt %, preferably 0.5 to 7 wt %, and particularly preferably 1 to 5 wt %. If the proportion exceeds 10 wt %, storage stability of the composition, properties of the cured products, and the like are impaired. On the other hand, if the proportion is less than 0.01 wt %, curing velocity is sometimes reduced.

In the present invention, polymerizable monomers having a vinyl group or a (meth)acryloyl group except for the component (A) can be used as an optional component. These monomers may be either a monofunctional monomer or a polyfunctional monomer.

Examples of the above monofunctional monomers include: vinyl group-containing monomers such as N-vinyl caprolactam, N-vinyl pyrrolidone, N-vinylcarbazole, and vinylpyridine, acrylamide, acryloylmorpholine, 7-amino-3, 7-dimethyloctyl (meth)acrylate, isobutoxymethyl (meth) acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide tetrachlorophenyl (meth) acrylate, 2-tetrachlorophenoxyethyl (meth)acrylate, tetrahydrofurfuryl (meth)acrylate, tetrabromophenyl (meth) acrylate, 2- tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, phenoxyethyl (meth)acrylate, butoxyethyl (meth) acrylate, pentachlorophenyl (meth)acrylate, pentabromophenyl (meth)acrylate, polyethylene glycol mono(meth) acrylate, polypropylene glycol mono(meth)acrylate, bornyl (meth)acrylate, methyltriethylene diglycol (meth)acrylate, and the like. Of these, N-vinyl caprolactam, N-vinyl pyrrolidone, acryloylmorpholine, N-vinylcarbazole, isobornyl (meth)acrylate, phenoxyethyl (meth)acrylate, and the like are preferable, and N-vinyl caprolactam, N-vinyl pyrrolidone, isobornyl (meth)acrylate, and acryloylmorpholine are particularly preferable. Among these preferable compounds, acryloylmorpholine can be suitably used.

As examples of commercially available products of these monofunctional monomers, Aronix M-111, M-113, M-117 (manufactured by Toagosei Co., Ltd.), Kayarad TC110S, R-629, R-644 (manufactured by Nippon Kayaku Co., Ltd.), Viscoat 3700 (manufactured by Osaka Organic Chemical Industry Co., Ltd.), and the like can be given.

Examples of the polyfunctional monomers include (meth) acryloyl group-containing monomers such as ethylene glycol di(meth)acrylate, dicyclopentenyl di(meth)acrylate, triethylene glycol diacrylate, tetraethylene glycol di(meth) acrylate, tricyclodecanediyldimethylene di(meth)acrylate, tripropylene diacrylate, neopentyl glycol di(meth)acrylate, both-terminal (meth)acrylate of ethylene oxide addition bisphenol A, both-terminal (meth)acrylate of propylene oxide addition bisphenol A, both-terminal (meth)acrylate of ethylene oxide addition tetrabromo bisphenol A, both-terminal (meth)acrylate of propylene oxide addition tetrabromo bisphenol A, both terminal (meth)acrylate of bisphenol A diglycidyl ether, both-terminal (meth)acrylate of tetrabromo bisphenol A diglycidyl ether, 1,1,4-butanediol di(meth)acrylate, 6-hexanediol di(meth)acrylate, polyester di(meth)acrylate, and polyethylene glycol di(meth)acrylate can be given.

Of these, both terminal (meth)acrylate of ethylene oxide addition bisphenol A, both-terminal (meth)acrylate of propylene oxide addition bisphenol A, tricyclodecanediyldimethylene di(meth)acrylate, tetra ethylene glycol di(meth) acrylate, tripropylene glycol di(meth)acrylate, neopentyl glycol di(meth)acrylate, and polyethylene glycol di(meth) acrylate are preferable.

As examples of commercially available products of the polyfunctional monomers, Yupimer UV, SA 1002 (manufactured by Mitsubishi Chemical Corp.), Viscoat 700 (manufactured by Osaka Organic Chemical Industry Co., Ltd.), Kayarad R-604 (manufactured by Nippon Kayaku Co., Ltd.), Aronix M-210 (manufactured by Toagosei Co., Ltd.), and the like can be given.

The polymerizable monomers used as an optional component are added in a proportion of preferably 0 to 10 wt % for the total weight of the compositions (A), (B), (C), and (D) of the present invention.

In the present invention, various additives can be used, as required. As examples of these additives, antioxidants, UV absorbers, lightstabilizers, silane coupling agents, aging preventives, heat polymerization inhibitors, coloring agents, leveling agents, surfactants, preservatives, plasticizers, lubricants, solvents, inorganic fillers, organic fillers, wettability improvers, coating surface improvers, and the like can be given.

As examples of commercially available products of antioxidants, Irganox 1010, 1035, 1076, 1222 (manufactured by Ciba Specialty Chemicals Co., Ltd.), and the like can be given. As examples of commercially available products of UV absorbers, Tinuvin P, 234, 320, 326, 327, 328, 213, 400 (manufactured by Ciba Specialty Chemicals Co., Ltd.), Sumisorb 110, 130, 140, 220, 250, 300, 320, 340, 350, 400 (manufactured by Sumitomo Chemical Industries Co., Ltd.), and the like can be given. As examples of commercially available products of lightstabilizers, Tinuvin 292, 144, 622LD (manufactured by Ciba-Geigy), Sanol LS-770, 765, 292, 2626, 1114, 744 (manufactured by Sankyo Chemical Co.), and the like can be given. As examples of commercially available products of silane coupling agents, γ-aminopropyltriethoxysilane, γ-mercaptopropyltrimethoxysilane, γ-methacryloxypropyltrimethoxysilane, SH6062, SZ6030 (manufactured by Toray-Dow Corning silicone Co., Ltd.), KBE903, KBM803 (manufactured by Shin-Etsu Silicone Co., Ltd.), and the like can be given. As examples of commercially available products of aging preventives, Antigene W, S, P, 3C, 6C, RD-G, FR, AW (manufactured by Sumitomo Chemical Industries Co., Ltd.), and the like can be given.

Moreover, polymerizable compounds such as epoxy resin, urethane (meth)acrylate, vinyl ether, propenyl ether, and maleic acid derivatives, polymers or oligomers such as polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicone-containing oligomer, and polysulfide oligomer can be also added in the composition of the present invention as other additives.

Component (E)

The liquid curable composition comprises a non-reactive solvent. Preferably, this solvent is of a type that does not react with other components (A), (B), (C) and (D) under irradiation of UV light or at ambient temperature. More preferably, this solvent is of a type that does not attack an intended substrate. Hence, for plastic substrates, alkanols such as ethanol, propanol, butanol or the like are suitable. It is an advantage of the resin composition of the present invention that the liquid curable resin composition can comprise solvents that afford a long shelf life and do not attack plastic susbtrates.

Preferred solvents are relatively polar solvents like alkanols, alkanol-ethers, glycols, ketones and the like.

Examples of preferred solvents are ethanol, methanol, butanol, t-butanol, glycerol, acetone glycol-methylether, methylethylketone, methylisobutylketone, cyclohexanone and the like.

The amount of non-reactive solvent can vary within wide limits, and will be in general about 20–400% by weight of the composition A+B+C+D, preferably is about 50–200% by weight with respect to A–D.

The solvent used while preparing compound (B) preferably is—at least in part—the solvent (E).

It is another advantage of the present invention, that after evaporation of the non-reactive solvent, a coating is formed which is handeable, printable and that can e.g. be embossed.

Cured products having a pencil hardness of H to 7H at 23° C. can be obtained by cure the radiation curable resin composition of the present invention,. The cure shrinkage ratio which accompanies curing is usually 10% or less, and preferably 6% or less. In addition, the resulting cured products exhibit superior scratch resistance, and the like.

The cured composition of the present invention will preferably have a no visible defects, essentially no scratches as measured in accordance to the Scratch Resistance Test discussed below, and/or a haze value, as measured in accordance with the Abrasion Resistance Test discussed below, of less than 20, more preferably less than 10.

EXAMPLES

The present invention will now be described in detail by way of examples, which should not be construed as limiting the present invention.

Preparation of Alkoxysilane Compound
Preparation 1

20.6 parts by weight of isophorone diisocyanate was added dropwise to a solution of 7.8 parts by weight of mercaptopropyltrimethoxysilane and 0.2 part by weight of dibutyl tin dilaurate for one hour while stirring at 50° C. in a dry atmosphere. The mixture was stirred for three hours at 60° C. Then, 71.4 parts by weight of pentaerythritol triacylate was added dropwise to the mixture in one hour at 30° C., and the mixture was stirred for three hours at 60° C. to prepare the silane compound which is the alkoxysilane compound (hereinafter called "silane compound (A)"). The amount of the residual isocyanate in the resulting product was analyzed and found to be 0.1% or less, whereby the reaction was almost quantitatively terminated.

Preparation of Component (B)
Preparation 2

To the mixture of 8.1 parts by weight of the silane compound (A) prepared in Preparation 1, 90.5 parts by weight of Methanol Silica Sol (manufactured by Nissan Chemical Industries, Ltd.: methanol dispersed colloidal silica (average particle diameter; 0.01 to 0.02 $\mu$m, silica concentration; 30 wt %)) and 0.1 part by weight of ion exchanged water were added and stirred for three hours at 60° C. Then, 1.3 parts by weight of methylformate was added, and the mixture was stirred for one hour at the same temperature to obtain a transparent dispersion liquid. The content of the alkoxysilane compound residue adhering to silica particles in the dispersion liquid was approximately 20 wt % (hereinafter called "dispersion liquid 1a").

Combination Example of Composition

The preparation method for the composition of the present invention will be described below. The amount of each component formulated in the compositions is shown in Table 1.

Example 1

A mixture of 60 parts by weight of the dispersion liquid (1a) prepared in preparation 2, 10 parts by weight of dipentaerythritol hexacrylate, 5 parts by weight of isobornyl acrylate, 3 parts by weight of 1-hydroxycyclohexylphenyl ketone, and 20 parts by weight of Cyclomer ACA-210P (acid value: 125 mg/g) was stirred in an container shielded from ultraviolet rays for 30 minutes at room temperature to obtain a homogeneous solution of the composition of Example 1, which is shown in Table 1. The compositions of Examples 2 to 4 and Comparative Examples 1 to 3, which are shown in Table 1, were obtained using a similar operation.

Test Example

Test specimen were prepared from the resulting resin compositions obtained in Examples according to the following methods. Storage stability of liquid resins, tack-free test for dried coatings, scratch resistance, abrasion resistance, adhesion to a substrate, and coating appearance were evaluated as follows. The results are shown in table 2.

Preparation of Test Specimen

The resin compositions obtained in Examples and Comparative Examples were applied to commercially available PET (188 $\mu$m in thickness) about 5 $\mu$m in thickness using a wire bar coater (No. 10). After allowing to stand in an infrared drying oven for one minute at 40° C., the coatings were irradiated with ultraviolet rays at a dose of 0.3 J/cm$^2$ in air to obtain the cured coatings. Then, the cured coatings were maintained for 24 hours at 23 under a relative humidity of 50% to prepare the test specimen.

Storage Stability of Liquid Resin

Evaluation (100 hours after preparation of the specimen)

○: No turbidity was observed.

Δ: Slight white turbidity was observed.

×: White turbidity and precipitates were observed.

Tack-free Test for Dried Coating

The resin compositions obtained in the Examples and Comparative Examples were applied to commercially available PET film (film thickness of 188 $\mu$m) about 5 $\mu$m in thickness using a wire bar coater (No. 10). After the coatings were allowed to stand in an infrared drying oven for one minute at 40° C., adhesive properties of the coatings were evaluated by touching the coatings with a finger.

Evaluation
○: No adhesion was recognized (no tackiness)
×: Adhesion was recognized (tackiness observed)

Scratch Resistance Test

The test specimen was placed on an abrasion testing machine according to the Japan Society for Promotion of Scientific Research and subjected to reciprocating abrasion using #0000 steel wool under a load of 200 g. Abrasion was observed with the naked eye.

Evaluation

⊚: No scratch was observed.
○: 1 to 3 scratches were observed.
Δ: 4 to 10 scratches were observed.
×: 10 or more scratches were observed.

Abrasion Resistance Test

According to JIS R3221, haze values (ΔH) of the test specimen after a Taber's abrasion resistance test using a Taber's abrasion resistance test machine (abrasive wheel: CS-10F, load: 500 g, revolution: 100) were measured.

Adhesion to Substrate

According to JIS K5400, 100 1 mm×1 mm cross-cuts were formed on the surface of the test specimen to provide 11×11 cut lines. A commercially available cellophane tape was attached to the surface of each coating, the number (X) of 1 mm×1 mm squares remaining on the film was counted and indicated as X/100 when the tape was rapidly peeled off.

Appearance

Cracks on the surface, whitening, and haze were observed with the naked eye.

Evaluation

○: No defect was observed.
Δ: Slight cracks and haze were observed.
×: Appearance was remarkably impaired.

TABLE 1

| | | | Example | | | Comparative Example | |
|---|---|---|---|---|---|---|---|
| Example | | 1 | 2 | 3 | 4 | 1 | 2 | 3 |
| Component (B) | | | | | | | | |
| Dispersion liquid 1a | | 62 | 62 | 67 | 67 | 77 | 62 | 62 |
| Component (A) | | | | | | | | |
| DPHA[1] | | 10 | 10 | | | 15 | 10 | 10 |
| TMPTA[2] | | | | 10 | 10 | | | |
| Component (C) | Tg (° C.) | | | | | | | |
| ACA-210P[3] | 140 | 20 | | 20 | | | | |
| ACA-250[4] | 136 | | 20 | | 20 | | | |
| B-3004[5] | −10 | | | | | | 20 | |
| AP-2150[6] | 70 | | | | | | | 20 |
| Component (D) | | | | | | | | |
| Photopolymerization Initiator[7] | | 3 | 3 | 3 | 3 | 3 | 3 | 3 |
| IBA[8] | | 5 | 5 | 0 | 0 | 5 | 5 | 5 |

[1]Dipentaerythritol hexacrylate
[2]Pentaerythritol triacylate
[3]Cyclomer ACA-210P (acid value: 125 KOHmg/g) (manufactured by Daicel Chemical Industries, Ltd.)
[4]Cyclomer ACA-250 (acid value: 75 KOHmg/g) (manufactured by Daicel Chemical Industries, Ltd.)
[5]Uniresin B-3004 (acid value: 5 KOHmg/g or less) (manufactured by Shin-Nakamura Chemical Co., Ltd.)
[6]Uniresin AP-2150 (acid value: 5 KOHmg/g or less) (manufactured by Shin-Nakamura Chemical Co., Ltd.)
[7]Hydroxycyclohexyl phenyl ketone
[8]Isobornyl acrylate

TABLE 2

| | Example | | | | Comparative Example | | |
|---|---|---|---|---|---|---|---|
| Combination Example | 1 | 2 | 3 | 4 | 1 | 2 | 3 |
| Liquid resin storage stability | ⊚ | ⊚ | ⊚ | ⊚ | ⊚ | Δ | Δ |
| Tack free test after drying | ⊚ | ⊚ | ⊚ | ⊚ | × | × | ⊚ |
| Scratch resistance | ⊚ | ⊚ | ⊚ | ⊚ | ⊚ | × | Δ |
| Abrasion resistance | 3 | 3 | 6 | 6 | 3 | 50 | 30 |
| Adhesion to a substrate | ⊚ | ⊚ | ⊚ | ⊚ | ⊚ | ⊚ | ⊚ |
| Appearance | ⊚ | ⊚ | ⊚ | ⊚ | Δ | Δ | Δ |

EFFECT OF THE INVENTION

The liquid curable resin composition of the present invention can provide a cured coating exhibiting superior scratch resistance, excellent abrasion resistance, superior adhesion to a substrate, and fine appearance on the surface of plastic moldings, paintings, and the like. The liquid curable resin composition can be printed or embossed prior to exposure of activation energy since the coating is formed when the solvent is dried, and can be molded after the exposure to activation energy. More particularly, the liquid curable resin composition of the present invention can be suitably used as hard coatings for transfer foil films, plastic optical parts, touch panels, film liquid crystal elements, plastic moldings, and the like, interior flooring materials, and stain-proof or scratch-resistant wall coatings.

What is claimed is:

1. A liquid curable resin composition comprising:
   (A) a polyfunctional (meth)acrylic compound containing at least three (meth)acryloyl groups in the molecule,
   (B) crosslinkable inorganic particles,
   (C) a radiation curable acrylic resin having a Tg of 50° C. or higher and an acid value of 20–650 KOH mg/g, and optionally
   (D) a radiation polymerization initiator.

2. The composition according to claim 1, wherein said inorganic particles are silica particles.

3. The composition according to claim 1, wherein said inorganic particles comprise an alkoxysilane compound having a linking group represented by formula (1):

$$-X-\underset{\underset{Y}{\|}}{C}-NH- \tag{1}$$

wherein X represents —NH, —O or —S, and Y represents an oxygen atom or a sulfur atom, provided that, when X is —O, Y is a sulfur atom.

4. The composition according to claim 2, wherein the silica particles have an average diameter of 0.001 μm to 20 μm.

5. The composition according to claim 1, wherein component (C) comprises (meth)acrylate groups.

6. The composition according to claim 1, wherein the composition further comprises a polymerizable monomer having a functional group different than that of component (A).

7. The composition according to claim 1, wherein the composition comprises 20–400% by weight, relative to the total weight of (A), (B), (C) and (D), of a non-reactive solvent (E).

8. A coating obtained by evaporation of component (E) from the composition according to claim 7.

9. A cured coating of the composition according to claim 1, obtained by irradiation.

10. The coating according to claim 9, wherein the coating has a pencil hardness of H to 7H at 23° C.

11. The coating according to claim 9, wherein said coating has no visible defects.

12. The coating according to claim 9, wherein said coating has a haze value measured by the Abrasion Resistance Test of less than 20.

13. The composition according to claim 1, wherein said composition contains about 5 to 30% by weight of component (A), relative to the total weight of (A), (B) and (C).

14. The composition according to claim 1, wherein said composition contains about 20 to 85% by weight of component (B), relative to the total weight of (A), (B), (C) and (D).

15. The composition according to claim 1, wherein said composition contains about 10 to 50% by weight of component (C), relative to the total weight of (A), (B), (C) and (D).

* * * * *